United States Patent
Awata et al.

(10) Patent No.: US 12,047,811 B2
(45) Date of Patent: Jul. 23, 2024

(54) WIRELESS COMMUNICATION TERMINAL AND COMMUNICATION CONTROL METHOD

(71) Applicant: Sony Group Corporation, Tokyo (JP)

(72) Inventors: Ryo Awata, Tokyo (JP); Noriaki Taira, Tokyo (JP); Mitsuharu Imai, Tokyo (JP); Yu Miyajima, Tokyo (JP); Manabu Onishi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 349 days.

(21) Appl. No.: 17/607,431

(22) PCT Filed: May 28, 2019

(86) PCT No.: PCT/JP2019/021075
§ 371 (c)(1),
(2) Date: Oct. 29, 2021

(87) PCT Pub. No.: WO2020/240691
PCT Pub. Date: Dec. 3, 2020

(65) Prior Publication Data
US 2022/0217580 A1     Jul. 7, 2022

(51) Int. Cl.
*H04W 28/06*     (2009.01)
*H04W 4/38*     (2018.01)
*H04W 4/80*     (2018.01)

(52) U.S. Cl.
CPC ............ *H04W 28/06* (2013.01); *H04W 4/38* (2018.02); *H04W 4/80* (2018.02)

(58) Field of Classification Search
CPC .......... H04W 28/06; H04W 4/38; H04W 4/80
See application file for complete search history.

(56) References Cited

U.S. PATENT DOCUMENTS

| | | | |
|---|---|---|---|
| 9,850,001 B1 | 12/2017 | Gill | |
| 10,158,978 B1* | 12/2018 | Jantzi | G01S 19/09 |
| 10,298,505 B1* | 5/2019 | Grant | H04L 43/16 |
| 2009/0179762 A1* | 7/2009 | Itasaki | G06K 17/00 |
| | | | 340/572.1 |
| 2017/0195848 A1* | 7/2017 | Korneluk | H04W 4/80 |

(Continued)

FOREIGN PATENT DOCUMENTS

| | | |
|---|---|---|
| JP | 2009541018 A | 11/2009 |
| JP | 2011-28384 A | 2/2011 |

(Continued)

OTHER PUBLICATIONS

International Search Report and Written Opinion mailed on Aug. 20, 2019, received for PCT Application PCT/JP2019/021075, Filed on May 28, 2019, 7 pages including English Translation.

*Primary Examiner* — Kan Yuen
(74) *Attorney, Agent, or Firm* — XSENSUS LLP

(57) ABSTRACT

A wireless communication terminal includes a memory, a processor, and a wireless communication module. The memory can store a plurality of transmission patterns different from each other and payload patterns respectively corresponding to the plurality of transmission patterns. The processor generates a payload according to the plurality of transmission patterns and payload patterns stored in the memory. The wireless communication module wirelessly transmits data including the payload.

11 Claims, 12 Drawing Sheets

(56) References Cited

U.S. PATENT DOCUMENTS

| | | | | |
|---|---|---|---|---|
| 2018/0097775 A1* | 4/2018 | Obaidi | ................ | H04L 63/0236 |
| 2018/0097886 A1* | 4/2018 | Inoue | .................... | G06F 16/438 |
| 2018/0098230 A1* | 4/2018 | Obaidi | .................... | H04W 4/08 |
| 2019/0114816 A1 | 4/2019 | Tham | | |

FOREIGN PATENT DOCUMENTS

| | | |
|---|---|---|
| JP | 2018-67212 A | 4/2018 |
| JP | 2019-29967 A | 2/2019 |

* cited by examiner

FIG.3

| PAYLOAD PATTERN | INFORMATION |
|---|---|
| P01 | POSITION INFORMATION + USB EXTERNAL SENSOR INFORMATION [RECEIVING TIME (11 BITS) + USB EXTERNAL SENSOR DATA (28 BITS)] |
| P02 | POSITION INFORMATION + BLE EXTERNAL SENSOR INFORMATION [RECEIVING TIME (11 BITS) + BLE EXTERNAL SENSOR DATA (29 BITS)] |
| P03 | USB EXTERNAL SENSOR INFORMATION [RECEIVING TIME (11 BITS) + USB EXTERNAL SENSOR DATA (92 BITS)] |
| P04 | USB EXTERNAL SENSOR INFORMATION [RECEIVING TIME (11 BITS) + USB EXTERNAL SENSOR DATA (49 BITS)] + BLE EXTERNAL SENSOR INFORMATION [RECEIVING TIME (11 BITS) + BLE EXTERNAL SENSOR DATA (31 BITS)] |
| P05 | BLE EXTERNAL SENSOR INFORMATION [RECEIVING TIME (11 BITS) + BLE EXTERNAL SENSOR DATA (93 BITS)] |
| P06 | POSITION INFORMATION × 3 |
| P07 | POSITION INFORMATION × 2 |
| P08 | POSITION INFORMATION × 1 |
| P09 | BLE EXTERNAL SENSOR INFORMATION [RECEIVING TIME (11 BITS) + BLE EXTERNAL SENSOR DATA (36 BITS)] × 2 |
| P10 | BLE EXTERNAL SENSOR INFORMATION [RECEIVING TIME (11 BITS) + BLE EXTERNAL SENSOR DATA (19 BITS)] × 3 |
| P11 | BLE EXTERNAL SENSOR INFORMATION [RECEIVING TIME (11 BITS) + BLE EXTERNAL SENSOR DATA (10 BITS)] × 4 |
| P12 | BLE EXTERNAL SENSOR INFORMATION [RECEIVING TIME (11 BITS) + BLE EXTERNAL SENSOR DATA (5 BITS)] × 5 |

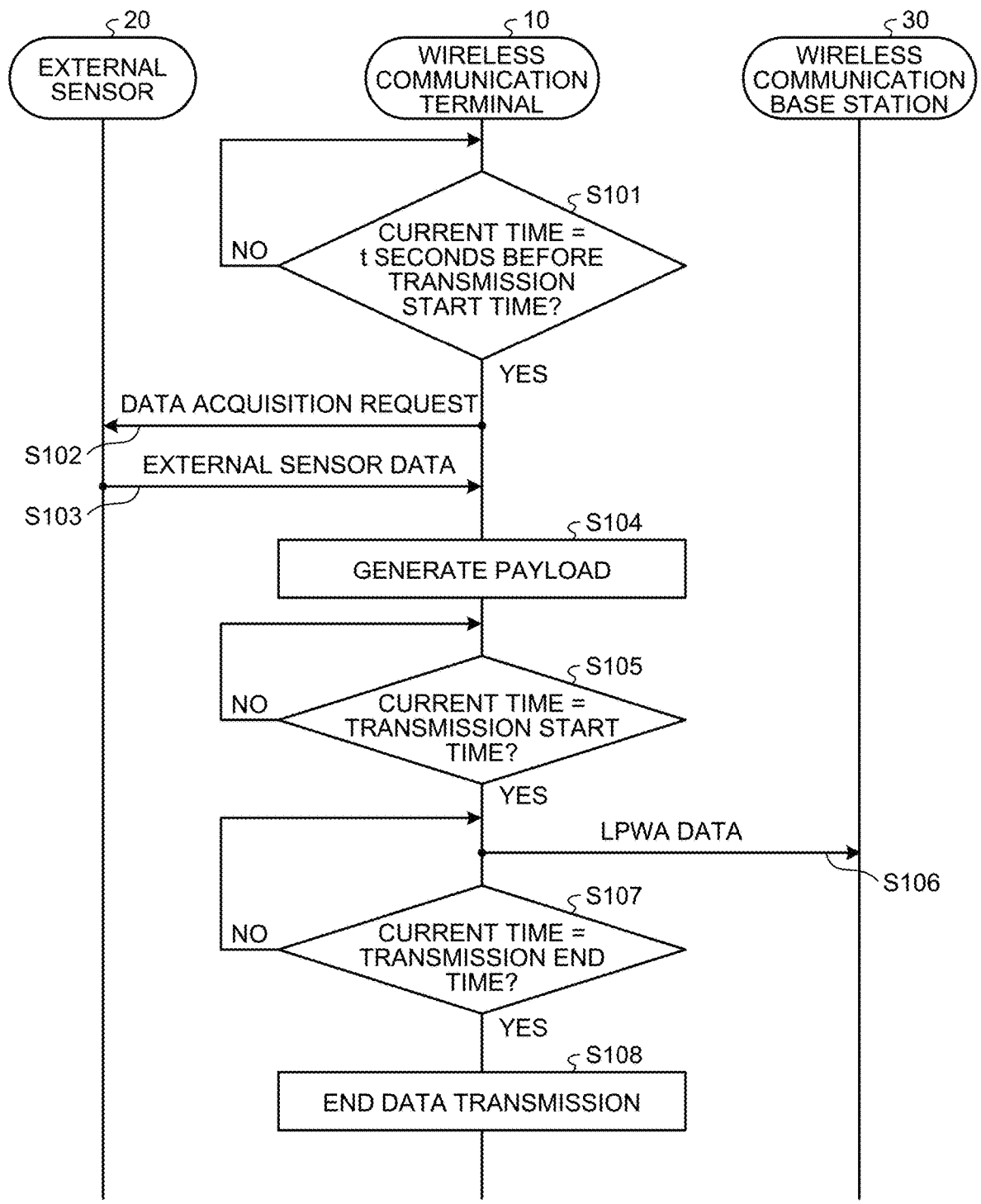

WIRELESS COMMUNICATION TERMINAL AND COMMUNICATION CONTROL METHOD

CROSS-REFERENCE TO RELATED APPLICATION

The present application is based on PCT filing PCT/JP2019/021075, filed May 28, 2019, the entire contents of which are incorporated herein by reference.

FIELD

The present disclosure relates to a wireless communication terminal and a communication control method.

BACKGROUND

There is known a system in which information acquired by a sensor is transmitted to a wireless communication terminal by using short-range wireless communication such as Bluetooth (registered trademark), and the wireless communication terminal transmits the information received from the sensor to a wireless communication base station, so that the information obtained from the sensor is processed by a server connected to the wireless communication base station. For example, in a system for managing security of a house, a sensor capable of detecting a locked state of a front door or a window of the house is mounted on the front door or the window, and information on the locked state is transmitted from the sensor to the wireless communication terminal so as to monitor the locked state by the server.

CITATION LIST

Patent Literature

Patent Literature 1: Japanese Laid-open Patent Publication No. 2018-067212

SUMMARY

Technical Problem

Conventionally, a dedicated wireless communication terminal is often used for each system with a difference purpose.

Therefore, the present disclosure proposes a highly versatile wireless communication terminal that can be selectively used according to various purposes.

Solution to Problem

In one aspect of the disclosed embodiment, a wireless communication terminal includes a memory capable of storing a plurality of transmission patterns different from each other and a payload pattern corresponding to each of the plurality of transmission patterns, a processor that generates a payload according to the plurality of transmission patterns and the payload pattern stored in the memory, and a wireless communication module that wirelessly transmits data including the payload.

BRIEF DESCRIPTION OF DRAWINGS

FIG. 3 is a diagram illustrating an example of a payload pattern according to the embodiment of the present disclosure.

FIG. 4 is a diagram illustrating an example of a processing procedure in the communication system according to the embodiment of the present disclosure.

DESCRIPTION OF EMBODIMENTS

Hereinafter, an embodiment of the present disclosure will be described with reference to the drawings. Note that, in the following embodiment, the same parts or the same processes are denoted by the same reference signs, and redundant description may be omitted.

In addition, the present disclosure will be described according to the following item order.

EMBODIMENT

<Configuration of communication system>
<Configuration of wireless communication terminal>
<Payload pattern>
<Transmission pattern>
<Processing procedure in communication system>
<Processing Example 1>
<Processing Example 2>
<Processing Example 3>
<Processing Example 4>
<Processing Example 5>
<Processing Example 6>
<Processing Example 7>
<Processing Example 8>
<Processing Example 9>
[Effects of disclosed technology]

EMBODIMENT

Figure 1:
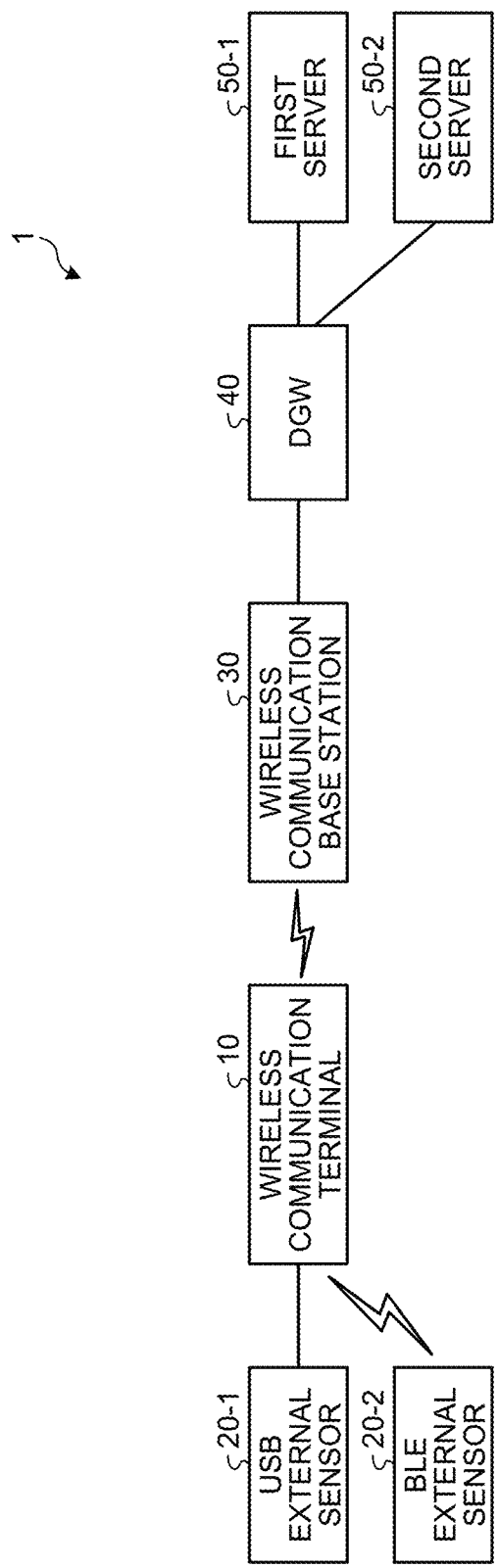
FIG. 1 is a diagram illustrating a configuration example of a communication system according to an embodiment of the present disclosure.

<Configuration of Communication System>
FIG. 1 is a diagram illustrating a configuration example of a communication system according to the embodiment of the present disclosure. In FIG. 1, a communication system 1 includes a wireless communication terminal 10, a universal serial bus (USB) external sensor 20-1, a Bluetooth (registered trademark) low energy (BLE) external sensor 20-2, a wireless communication base station 30, a data gateway (DGW) 40, a first server 50-1, and a second server 50-2.

The USB external sensor 20-1 is a sensor connected to the wireless communication terminal 10 from the outside of the wireless communication terminal 10 using a USB. The USB external sensor 20-1 is an example of a sensor connected to the wireless communication terminal 10 in a wired manner. Furthermore, the BLE external sensor 20-2 is a sensor connected to the wireless communication terminal 10 from the outside of the wireless communication terminal 10 using BLE. The BLE external sensor 20-1 is an example of a sensor connected to the wireless communication terminal 10 by short-distance wireless communication. Hereinafter, the USB external sensor 20-1 and the BLE external sensor 20-1 may be collectively referred to as "external sensor 20".

Data generated by the USB external sensor 20-1 (hereinafter, sometimes referred to as "USB external sensor data") and data generated by the BLE external sensor 20-2 (hereinafter, sometimes referred to as "BLE external sensor data") are transmitted from the respective external sensors 20 to the wireless communication terminal 10. The USB external sensor data includes information on a value detected by the USB external sensor 20-1, and the BLE external sensor data includes information on a value detected by the BLE external sensor 20-2. Hereinafter, the USB external sensor data and the BLE external sensor data may be collectively referred to as "external sensor data".

Examples of the external sensor 20 are an illuminance sensor that detects illuminance, a water level sensor that detects a water level, an odor sensor that detects an odor, a sound sensor capable of analyzing noise, abnormal sound, and scream by detecting sound, an atmospheric pressure sensor that detects atmospheric pressure, a temperature sensor that detects temperature, a humidity sensor that detects humidity, and an opening detection sensor that detects opening of a door or a window.

The wireless communication terminal 10 transmits the external sensor data received from the external sensor 20 to the wireless communication base station 30. The wireless communication terminal 10 communicates with the wireless communication base station 30 using, for example, a low-power wide-area (LPWA) wireless access system. The LPWA is an example of a long-distance wireless access system used for communication between the wireless communication terminal 10 and the wireless communication base station 30. Details of the wireless communication terminal 10 will be described later.

The wireless communication base station 30 transmits the external sensor data received from the wireless communication terminal 10 to the DGW 40.

The DGW 40 distributes and transmits the external sensor data to the first server 50-1 or the second server 50-2 according to a destination of the external sensor data.

The first server 50-1 and the second server 50-2 process the external sensor data according to a purpose. Hereinafter, the first server 50-1 and the second server 50-2 may be collectively referred to as a "server 50".

<Configuration of Wireless Communication Terminal>

Figure 2:
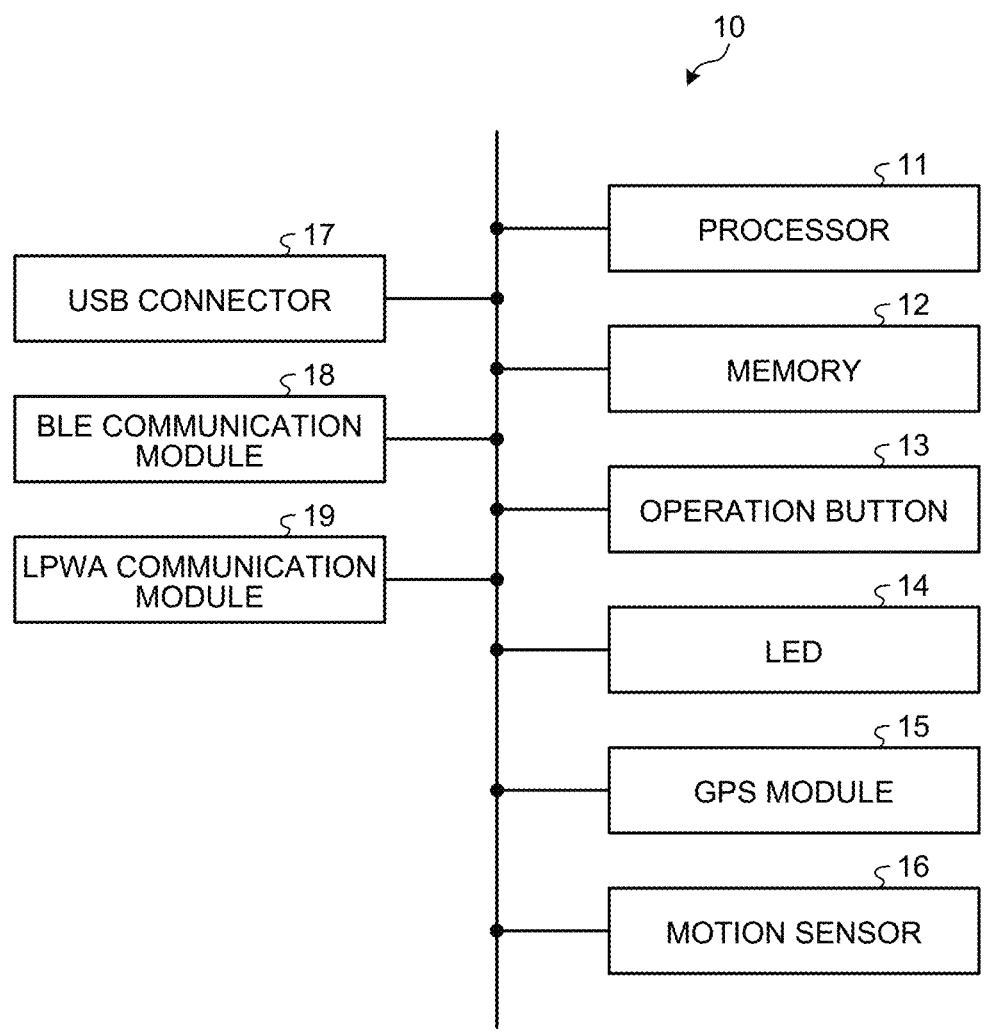
FIG. 2 is a diagram illustrating a configuration example of a wireless communication terminal according to the embodiment of the present disclosure.

FIG. 2 is a diagram illustrating a configuration example of the wireless communication terminal according to the embodiment of the present disclosure. In FIG. 2, the wireless communication terminal 10 includes a processor 11, a memory 12, an operation button 13, a light emitting diode (LED) 14, a global positioning system (GPS) module 15, a motion sensor 16, a USB connector 17, a BLE communication module 18, and an LPWA communication module 19.

The GPS module 15 acquires information indicating a current position of the wireless communication terminal 10 (hereinafter, also referred to as "position information"). The GPS module 15 is an example of a position information acquisition unit that acquires the position information.

The motion sensor 16 detects motion of the wireless communication terminal 10. For example, the motion sensor 16 is an acceleration sensor that detects acceleration of the wireless communication terminal 10. Furthermore, the motion sensor 16 may be a gyro sensor. The motion sensor 16 is an example of a sensor included in the wireless communication terminal 10. Examples of other sensors included in the wireless communication terminal 10 are an illuminance sensor, a sound sensor, an atmospheric pressure sensor, a temperature sensor, and a humidity sensor.

A connector included in the USB external sensor 20-1 and the USB connector 17 can be connected, and the processor 11 communicates with the USB external sensor 20-1 via the USB connector 17.

The BLE external sensor 20-2 and the BLE communication module 18 are wirelessly connectable, and the processor 11 communicates with the BLE external sensor 20-2 via the BLE communication module 18. Up to five BLE external sensors 20-2 can be connected to the BLE communication module 18 at the same time. The BLE communication module 18 is an example of a wireless communication module that performs short-distance wireless communication.

The wireless communication base station 30 and the LPWA communication module 19 are wirelessly connectable, and the processor 11 communicates with the wireless communication base station 30 through the LPWA communication module 19. The LPWA communication module 19 is an example of a wireless communication module that performs long-distance wireless communication.

<Payload Pattern>

FIG. 3 is a diagram illustrating an example of a payload pattern according to the embodiment of the present disclosure. Any one or a plurality of patterns P01 to P12 illustrated in FIG. 3 can be adopted as a pattern in the payload generated by the processor 11. The adopted payload pattern is set in the wireless communication terminal 10 by a service provider of the wireless communication terminal 10. Note that an end user of the wireless communication terminal 10 is prohibited from setting the payload pattern in the wireless communication terminal 10. The payload pattern set in the wireless communication terminal 10 is stored in the memory 12. The service provider of the wireless communication terminal 10 can set any one or more of the payload patterns P01 to P12 in the wireless communication terminal 10 by using, for example, a personal computer connected to the wireless communication terminal 10 via the USB connector 17, a smart device connected to the wireless communication terminal 10 via the BLE communication module 18, or the like.

In FIG. 3, the payload pattern P01 is formed of position information and USB external sensor information. The USB external sensor information in the payload pattern P01 is formed by 11-bit receiving time and 28-bit USB external sensor data. The receiving time included in the USB external sensor information indicates time when the wireless communication terminal 10 receives the USB external sensor data from the USB external sensor 20-1, and is acquired by the processor 11.

The payload pattern P02 is formed of position information and BLE external sensor information. The BLE external sensor information in the payload pattern P02 is formed by 11-bit receiving time and 29-bit BLE external sensor data. The receiving time included in the BLE external sensor information indicates time when the wireless communication terminal 10 receives the BLE external sensor data from the BLE external sensor 20-2, and is acquired by the processor 11.

The payload pattern P03 is formed of USB external sensor information. The USB external sensor information in the payload pattern P03 is formed of 11-bit receiving time and 92-bit USB external sensor data.

The payload pattern P04 is formed of USB external sensor information and BLE external sensor information. The USB external sensor information in the payload pattern P04 is formed of 11-bit receiving time and 49-bit USB external sensor data. Furthermore, the BLE external sensor information in the payload pattern P04 is formed of 11-bit receiving time and 31-bit BLE external sensor data.

The payload pattern P05 is formed of BLE external sensor information. The BLE external sensor information in the payload pattern P05 is formed of 11-bit receiving time and 93-bit BLE external sensor data.

The payload pattern P06 is formed of three pieces of position information.

The payload pattern P07 is formed of two pieces of position information.

The payload pattern P08 is formed of one piece of position information.

The payload pattern P09 is formed of two pieces of BLE external sensor information. Each of the two pieces of BLE external sensor information in the payload pattern P09 is formed of 11-bit receiving time and 36-bit BLE external sensor data.

The payload pattern P10 is formed of three pieces of BLE external sensor information. Each of the three pieces of BLE external sensor information in the payload pattern P10 is formed of 11-bit receiving time and 19-bit BLE external sensor data.

The payload pattern P11 is formed of four pieces of BLE external sensor information. Each of the four pieces of BLE external sensor information in the payload pattern P11 is formed of 11-bit receiving time and 10-bit BLE external sensor data.

The payload pattern P12 is formed of five pieces of BLE external sensor information. Each of the five pieces of BLE external sensor information in the payload pattern P12 is formed of 11-bit receiving time and 5-bit BLE external sensor data.

<Transmission Pattern>

As a transmission pattern of data (hereinafter, sometimes referred to as "LPWA data") transmitted by the processor 11 to the wireless communication base station 30 using LPWA, any one or more of a plurality of transmission patterns in which triggers for starting transmission of the LPWA data are different from each other can be adopted. The adopted transmission pattern is set in the wireless communication terminal 10 by the service provider or the end user of the wireless communication terminal 10. The transmission pattern set in the wireless communication terminal 10 is stored in the memory 12 in association with the payload pattern. The service provider or the end user of the wireless communication terminal 10 can set in the wireless communication terminal 10 any one or more of the plurality of transmission patterns by using, for example, a personal computer connected to the wireless communication terminal 10 via the USB connector 17, a smart device connected to the wireless communication terminal 10 via the BLE communication module 18, or the like.

Examples of the plurality of transmission patterns include the following four transmission patterns TP01 to TP04. The transmission pattern TP01 is a transmission pattern in which a trigger for starting transmission of the LPWA data is transmission start time of the LPWA data. The transmission pattern TP02 is a transmission pattern in which the trigger for starting transmission of the LPWA data is a transmission interval of the LPWA data. The transmission pattern TP03 is a transmission pattern in which the trigger for starting transmission of the LPWA data is an output of the external sensor 20 or the motion sensor 16. The transmission pattern TP04 is a transmission pattern in which the trigger for starting transmission of the LPWA data is an operation on the operation button 13.

<Processing Procedure in Communication System>

FIGS. 4 to 12 are diagrams illustrating an example of a processing procedure in the communication system according to the embodiment of the present disclosure. Hereinafter, processing examples 1 to 9 will be described as examples of the processing procedure in the communication system.

Processing Example 1: FIG. 4

In Processing Example 1, the transmission pattern TP01 and any one of the payload patterns P01, P02, P03, and P05 are stored in the memory 12 in association with each other. In addition, in Processing Example 1, the transmission pattern TP02 and any one of the payload patterns P01, P02, P03, and P05 are stored in the memory 12 in association with each other. In Processing Example 1, the payload pattern associated with the transmission pattern TP01 and the payload pattern associated with the transmission pattern TP02 are the same payload pattern.

In FIG. 4, in Step S101, the processor 11 waits for communication with the external sensor 20 until the current time reaches predetermined t seconds before the transmission start time (Step S101: No). Values of the transmission start time and t seconds are preset in the wireless communication terminal 10 by the service provider or the end user of the wireless communication terminal 10, and stored in the memory 12. Further, the transmission start time and the value of t seconds selected in advance from a plurality of candidates by the service provider or the end user of the wireless communication terminal 10 may be stored in the memory 12.

When the current time reaches t seconds before the transmission start time (Step S101: Yes), the processor 11 transmits a "data acquisition request" for requesting acquisition of the external sensor data to the external sensor 20 in Step S102, and the external sensor 20 receives the data acquisition request.

In Step S103, the external sensor 20 that has received the data acquisition request transmits the external sensor data to the wireless communication terminal 10, and the processor 11 receives the external sensor data.

Next, in Step S104, the processor 11 generates a payload including the external sensor data received in Step S103 according to the payload pattern stored in the memory 12 in association with the transmission patterns TP01 and TP02.

Next, in Step 105, the processor 11 waits for communication with the wireless communication base station 30 until the current time reaches the transmission start time (Step S105: No).

When the current time reaches the transmission start time (Step S105: Yes), in Step S106, the processor 11 transmits the LPWA data including the payload generated in Step S104 to the wireless communication base station 30.

Then, the processor 11 repeatedly transmits the LPWA data at a constant transmission interval T1 (Step S106) until the current time reaches transmission end time (Step S107: No). Values of the transmission start time, the transmission end time, and the transmission interval T1 are preset in the wireless communication terminal 10 by the service provider or the end user of the wireless communication terminal 10, and stored in the memory 12. As the transmission interval T1, for example, a value from 1 minute to 1440 minutes can be set in increments of 1 minute. Further, for example, as the transmission interval T1, a value from 1 hour to 24 hours can be set in increments of 1 hour.

Then, when the current time reaches the transmission end time (Step S107: Yes), the processor 11 ends the transmission of the LPWA data in Step S108.

Figure 5:
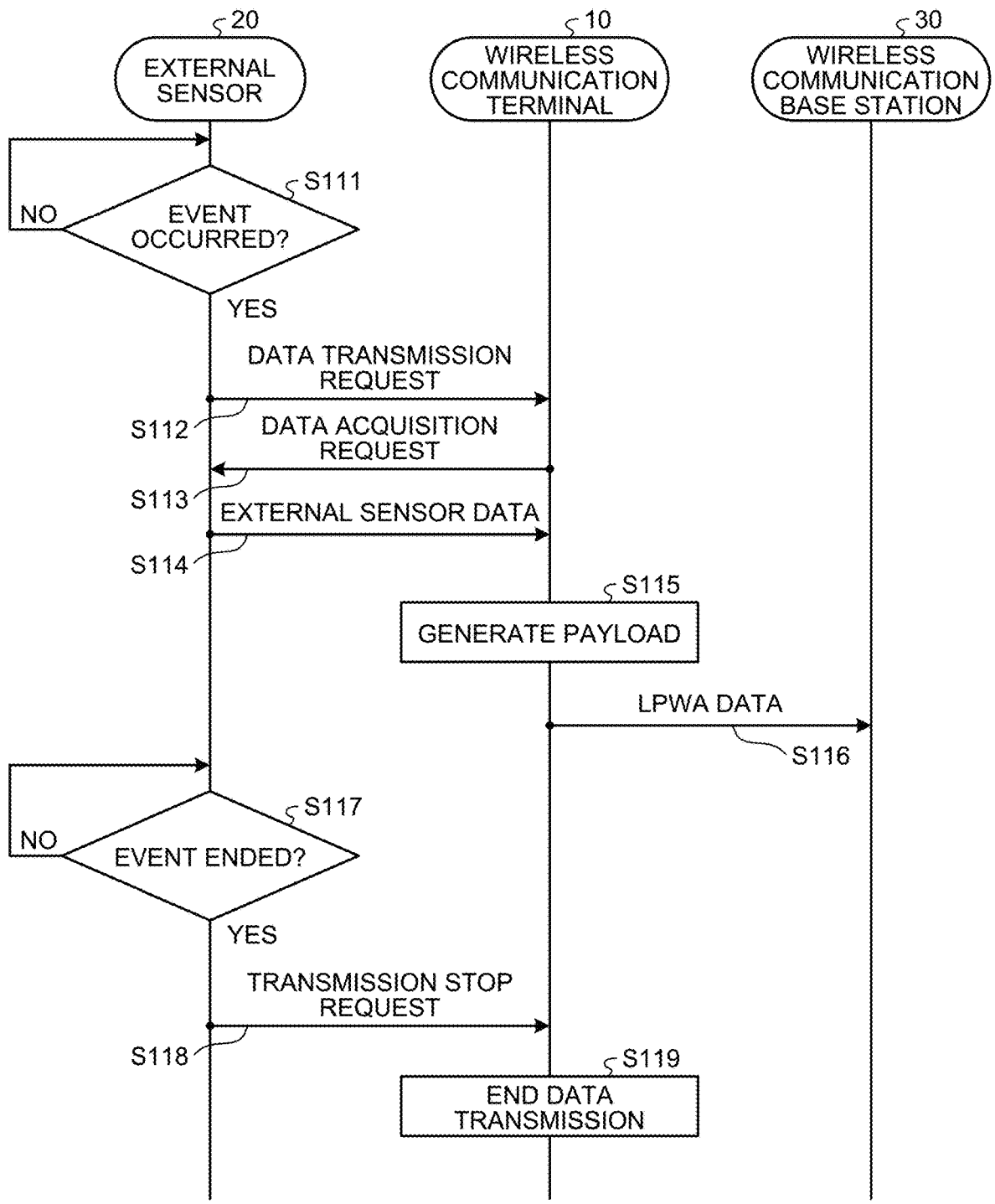
FIG. 5 is a diagram illustrating an example of the processing procedure in the communication system according to the embodiment of the present disclosure.

Processing Example 2: FIG. 5

In Processing Example 2, the transmission pattern TP03 and any one of the payload patterns P01, P02, P03, and P05 are stored in the memory 12 in association with each other. Further, in Processing Example 2, the transmission pattern TP02 and any one of the payload patterns P01, P02, P03, and P05 are stored in the memory 12 in association with each other. In Processing Example 2, the payload pattern associated with the transmission pattern TP03 and the payload pattern associated with the transmission pattern TP02 are the same payload pattern.

In FIG. 5, in Step S111, the external sensor 20 waits for communication with the wireless communication terminal 10 until an event occurs (Step S111: No). In a case where the external sensor 20 is, for example, a water level sensor, an example of occurrence of the event is that a water level detected by the external sensor 20 is equal to or less than a predetermined threshold.

When the event occurs (Step S111: Yes), the external sensor 20 outputs a "data transmission request" for requesting start of transmission of the LPWA data and transmits the data transmission request to the wireless communication terminal 10, and the processor 11 receives the data transmission request in Step S112.

In Step S113, the processor 11 that has received the data transmission request transmits the data acquisition request to the external sensor 20, and the external sensor 20 receives the data acquisition request.

In Step S114, the external sensor 20 that has received the data acquisition request transmits the external sensor data to the wireless communication terminal 10, and the processor 11 receives the external sensor data.

Next, in Step S115, the processor 11 generates a payload including the external sensor data received in Step S114 according to the payload pattern stored in the memory 12 in association with the transmission patterns TP03 and TP02.

Next, in Step 116, the processor 11 transmits the LPWA data including the payload generated in Step S115 to the wireless communication base station 30. Then, the processor 11 repeats the processing in Steps S113 to S116 at the constant transmission interval T1 until a transmission stop request is received in Step S118.

On the other hand, in Step S117, the external sensor 20 monitors an end of the event (Step S117: No). Then, when the event ends (Step S117: Yes), in Step 118, the external sensor 20 outputs the "transmission stop request" for requesting stopping of transmission of the LPWA data and transmits the transmission stop request to the wireless communication terminal 10. The processor 11 receives the transmission stop request. In a case where the external sensor 20 is, for example, the water level sensor, an example of the end of the event is that the water level detected by the external sensor 20 exceeds the predetermined threshold.

Upon receiving the transmission stop request, the processor 11 ends the transmission of the LPWA data in Step S119.

Here, Processing Example 2 can be used, for example, for house security management. For example, the BLE external sensor 20-2 that detects opening of a door or a window is mounted on a front door or a window. In accordance with Processing Example 2 (FIG. 5), in a case where the BLE external sensor 20-2 detects the opening (Step S111: Yes), the processor 11 transmits the LPWA data including alert information to the wireless communication base station 30 (Step S116).

Furthermore, for example, Processing Example 1 and Processing Example 2 can be combined and used for management of a water server installed in an office or at home. For example, as the external sensor 20, the BLE external sensor 20-2 that detects the water level is attached to a tank of the water server. The processor 11 periodically transmits the LPWA data including information on the water level (i.e., a remaining amount of water) of the tank to the wireless communication base station 30 according to Processing Example 1 (FIG. 4). In addition, the processor 11 transmits the LPWA data including the alert information to the wireless communication base station 30 when the water level of the tank becomes equal to or less than the predetermined threshold according to Processing Example 2 (FIG. 5).

Figure 6:
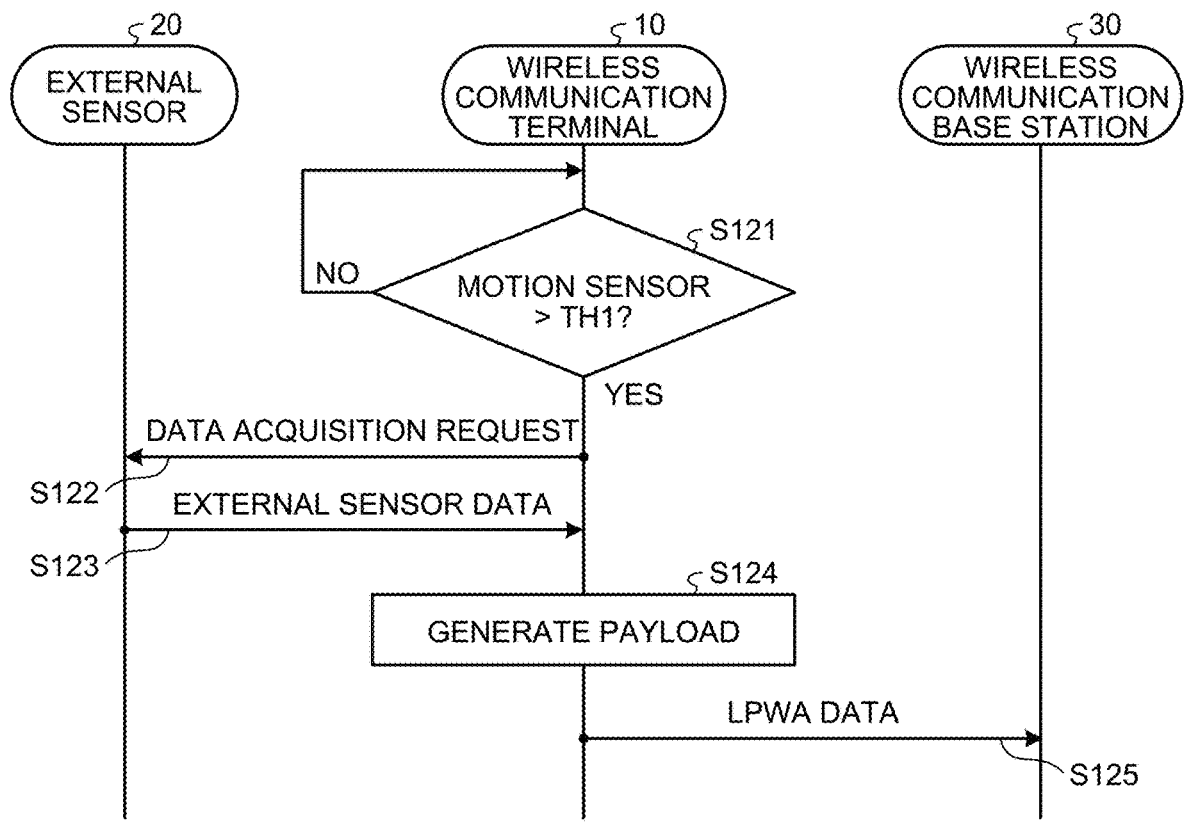
FIG. 6 is a diagram illustrating an example of the processing procedure in the communication system according to the embodiment of the present disclosure.

Processing Example 3: FIG. 6

In Processing Example 3, the transmission pattern TP03 and any one of the payload patterns P01, P02, P03, and P05 are stored in the memory 12 in association with each other.

In FIG. 6, in Step S121, the motion sensor 16 outputs a detected acceleration value to the processor 11, and the processor 11 waits for communication with the external sensor 20 until the detected acceleration value exceeds a threshold TH1 (Step S121: No). The threshold TH1 is preset in the wireless communication terminal 10 by the service provider or the end user of the wireless communication terminal 10, and stored in the memory 12.

When the acceleration value detected by the motion sensor 16 exceeds the threshold TH1 (Step S121: Yes), in Step S122, the processor 11 transmits a data acquisition request to the external sensor 20, and the external sensor 20 receives the data acquisition request.

In Step S123, the external sensor 20 that has received the data acquisition request transmits the external sensor data to the wireless communication terminal 10, and the processor 11 receives the external sensor data.

Next, in Step S124, the processor 11 generates a payload including the external sensor data received in Step S123 according to the payload pattern stored in the memory 12 in association with the transmission pattern TP03.

Next, in Step 125, the processor 11 transmits the LPWA data including the payload generated in Step S124 to the wireless communication base station 30. Then, the processor 11 ends the transmission of the LPWA data after repeatedly transmitting the LPWA data for a predetermined number of times at a constant transmission interval T2. Values of the predetermined number of times of transmission and the transmission interval T2 of the LPWA data are preset in the wireless communication terminal 10 by the service provider or the end user of the wireless communication terminal 10, and stored in the memory 12. As the transmission interval T2, for example, a value from 1 minute to 1440 minutes can be set in increments of 1 minute. However, the transmission interval T2 is preferably set to a value smaller than the transmission interval T1.

Here, Processing Example 3 can be used, for example, for abnormality monitoring of an exhibit. In a case where Processing Example 3 is used for abnormality monitoring of the exhibit, the external sensor 20 is not connected to the wireless communication terminal 10. Therefore, the processing in Steps S122 and S123 in FIG. 6 is omitted. When Processing Example 3 is used for abnormality monitoring of the exhibit, the wireless communication terminal 10 is mounted on the exhibit. When an acceleration value detected by the motion sensor 16 exceeds the threshold TH1 (Step S121: Yes) according to Processing Example 3 (FIG. 6), the processor 11 determines that an abnormality has occurred in the exhibit, for example, an impact has been applied to the exhibit or the exhibit has been moved, and transmits the LPWA data including the alert information to the wireless communication base station 30.

Figure 7:
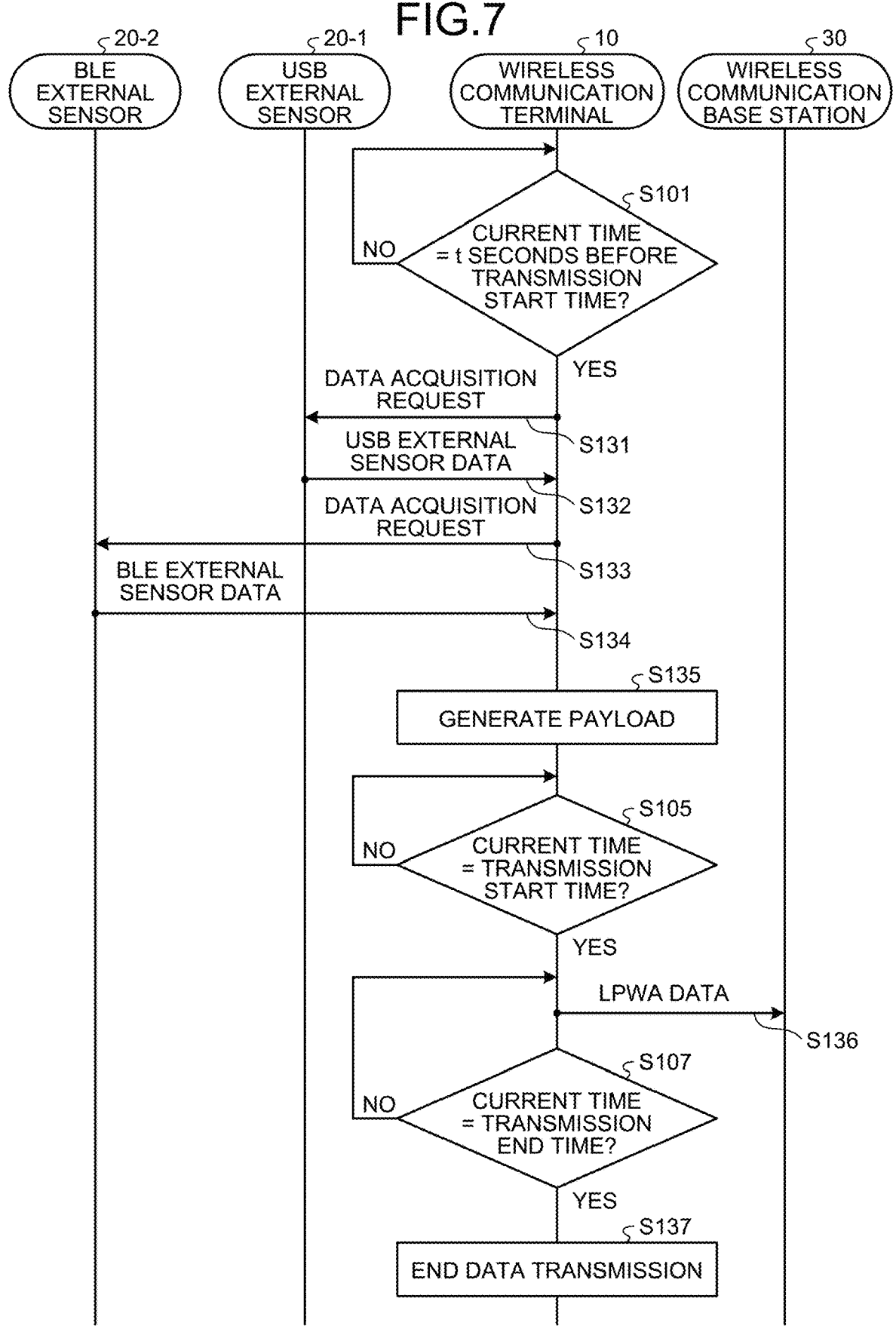
FIG. 7 is a diagram illustrating an example of the processing procedure in the communication system according to the embodiment of the present disclosure.

Processing Example 4: FIG. 7

In Processing Example 4, the transmission pattern TP01 and the payload pattern P04 are stored in the memory 12 in association with each other. In addition, in Processing Example 4, the transmission pattern TP02 and the payload pattern P04 are stored in the memory 12 in association with each other.

In FIG. 7, in Step S101, the processor 11 waits for communication with the external sensor 20 until the current time reaches t seconds before the transmission start time (Step S101: No).

When the current time reaches t seconds before the transmission start time (Step S101: Yes), in Step S131, the processor 11 transmits the data acquisition request to the USB external sensor 20-1, and the USB external sensor 20-1 receives the data acquisition request.

In Step S132, the USB external sensor 20-1 that has received the data acquisition request transmits the USB external sensor data to the wireless communication terminal 10, and the processor 11 receives the USB external sensor data.

Then, in Step S133, the processor 11 transmits the data acquisition request to the BLE external sensor 20-2, and the BLE external sensor 20-2 receives the data acquisition request.

In Step S134, the BLE external sensor 20-2 that has received the data acquisition request transmits the BLE external sensor data to the wireless communication terminal 10, and the processor 11 receives the BLE external sensor data.

Next, in Step S135, the processor 11 generates a payload including the USB external sensor data received in Step S132 and the BLE external sensor data received in Step S134 according to the payload pattern P04 stored in the memory 12 in association with the transmission patterns TP01 and TP02.

Next, in Step 105, the processor 11 waits for communication with the wireless communication base station 30 until the current time reaches the transmission start time (Step S105: No).

When the current time reaches the transmission start time (Step S105: Yes), in Step S136, the processor 11 transmits the LPWA data including the payload generated in Step S135 to the wireless communication base station 30.

Then, the processor 11 repeatedly transmits the LPWA data at the constant transmission interval T1 (Step S136) until the current time reaches the transmission end time (Step S107: No).

Then, when the current time reaches the transmission end time (Step S107: Yes), the processor 11 ends the transmission of the LPWA data in Step S137.

Figure 8:
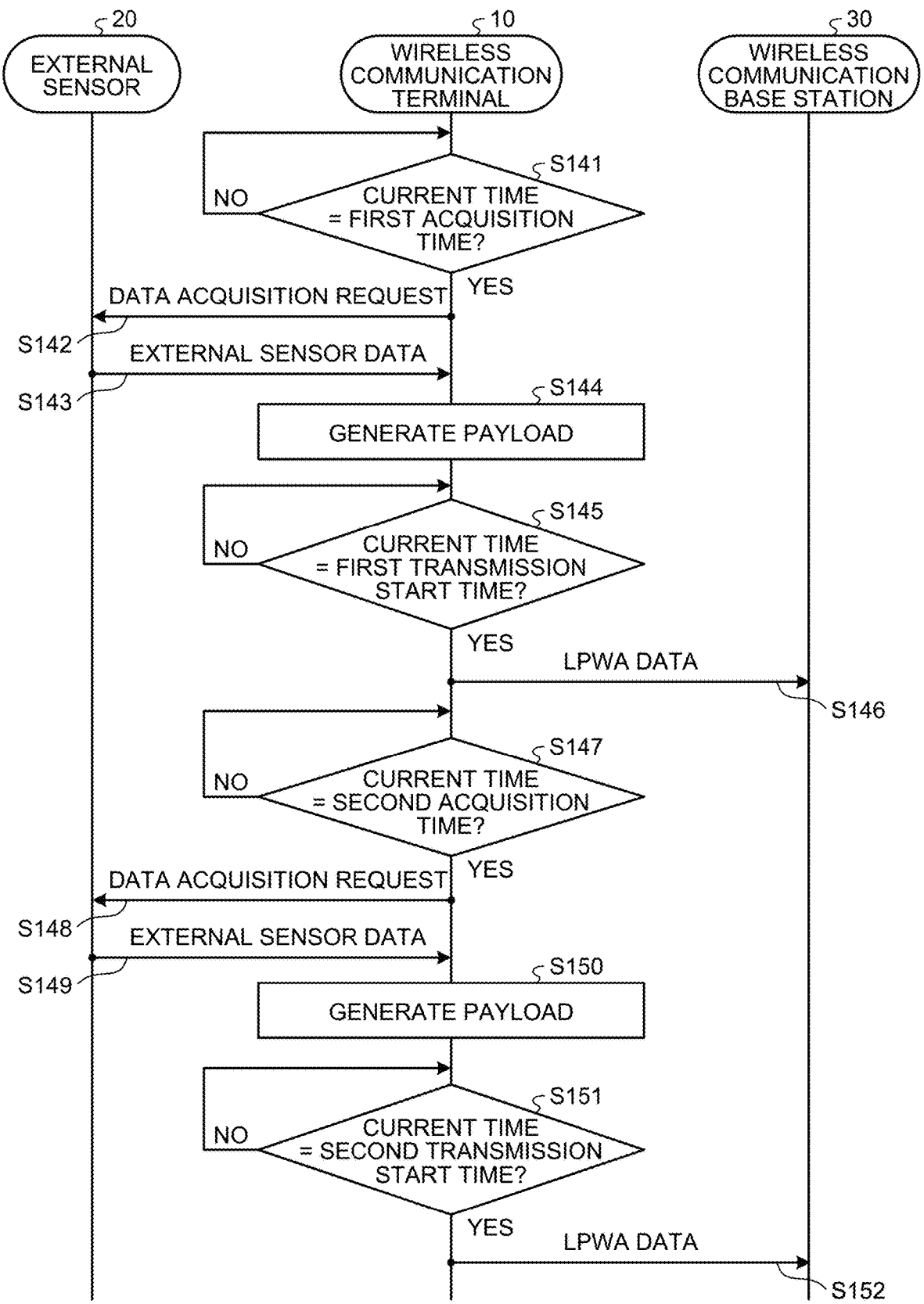
FIG. 8 is a diagram illustrating an example of the processing procedure in the communication system according to the embodiment of the present disclosure.

Processing Example 5: FIG. 8

In Processing Example 5, the transmission pattern TP01 and any one of the payload patterns P01, P02, P03, and P05 are stored in the memory 12 in association with each other.

In FIG. 8, in Step S141, the processor 11 waits for communication with the external sensor 20 until the current time reaches first acquisition time (Step S141: No). The first acquisition time is preset in the wireless communication terminal 10 by the service provider or the end user of the wireless communication terminal 10, and stored in the memory 12.

When the current time reaches the first acquisition time (Step S141: Yes), in Step S142, the processor 11 transmits the data acquisition request to the external sensor 20, and the external sensor 20 receives the data acquisition request.

In Step S143, the external sensor 20 that has received the data acquisition request transmits the external sensor data to the wireless communication terminal 10, and the processor 11 receives the external sensor data.

Next, in Step S144, the processor 11 generates a payload including the external sensor data received in Step S143 according to the payload pattern stored in the memory 12 in association with the transmission pattern TP01.

Next, in Step 145, the processor 11 waits for communication with the wireless communication base station 30 until the current time reaches first transmission start time (Step S145: No).

When the current time reaches the first transmission start time (Step S145: Yes), in Step S146, the processor 11 transmits the LPWA data including the payload generated in Step S144 to the wireless communication base station 30.

After transmitting the LPWA data in Step S146, the processor 11 waits for communication with the external sensor 20 until the current time reaches second acquisition time in Step S147 (Step S147: No). The second acquisition time is preset in the wireless communication terminal 10 by the service provider or the end user of the wireless communication terminal 10, and stored in the memory 12.

When the current time reaches the second acquisition time (Step S147: Yes), in Step S148, the processor 11 transmits the data acquisition request to the external sensor 20, and the external sensor 20 receives the data acquisition request.

In Step S149, the external sensor 20 that has received the data acquisition request transmits the external sensor data to the wireless communication terminal 10, and the processor 11 receives the external sensor data.

Next, in Step S150, the processor 11 generates a payload including the external sensor data received in Step S149 according to the payload pattern stored in the memory 12 in association with the transmission pattern TP01.

Next, in Step 151, the processor 11 waits for communication with the wireless communication base station 30 until the current time reaches the second transmission start time (Step S151: No).

When the current time reaches the second transmission start time (Step S151: Yes), in Step S152, the processor 11 transmits the LPWA data including the payload generated in Step S150 to the wireless communication base station 30.

When the external sensor 20 in FIG. 8 is the BLE external sensor 20-2, the processor 11 may generate a payload including the BLE external sensor data received in Step S143 and the BLE external sensor data received in Step S149 according to the payload pattern P09.

Figure 9:
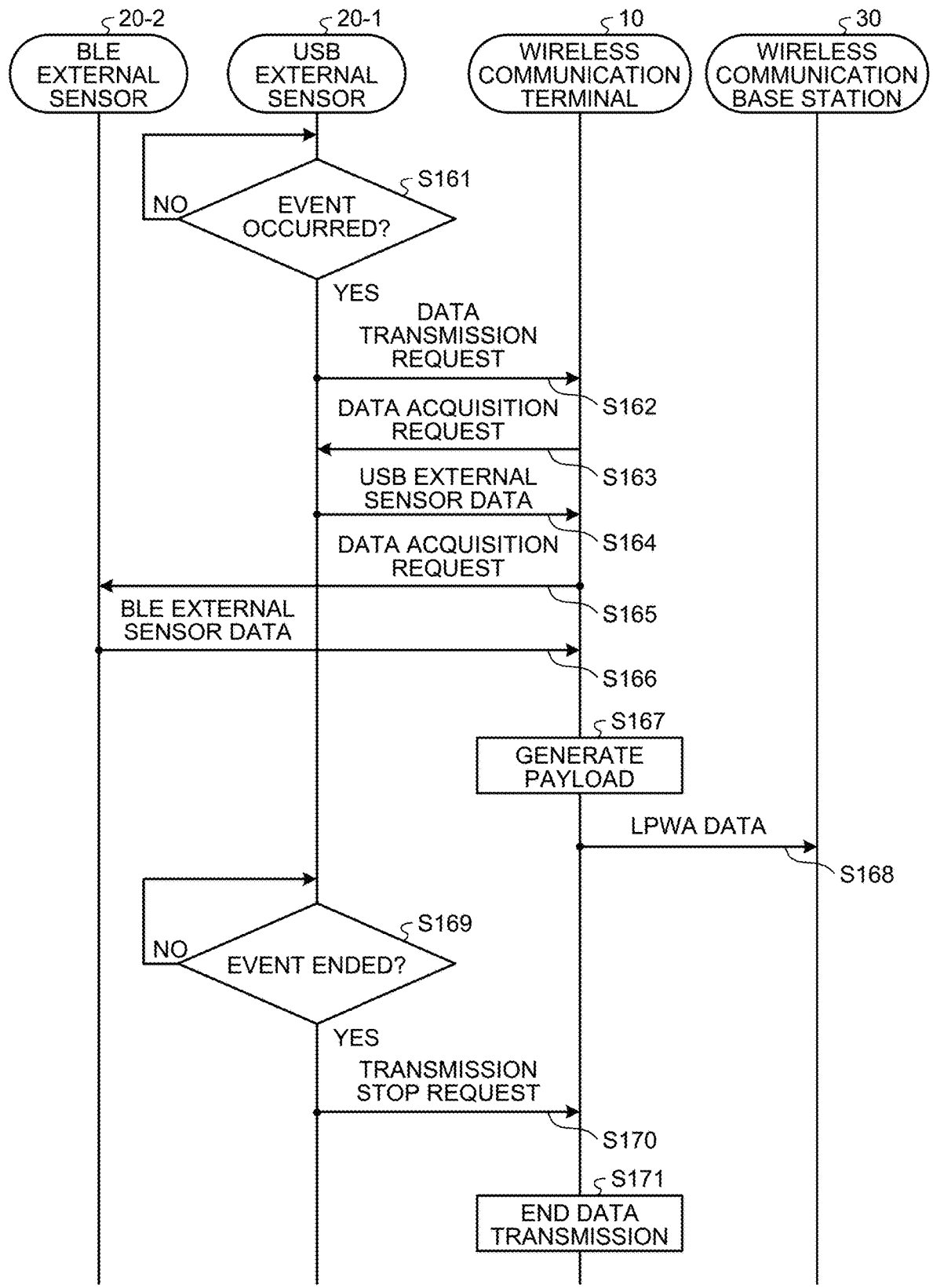
FIG. 9 is a diagram illustrating an example of the processing procedure in the communication system according to the embodiment of the present disclosure.

Processing Example 6: FIG. 9

In Processing Example 6, the transmission pattern TP03 and the payload pattern P04 are stored in the memory 12 in association with each other.

In FIG. 9, in Step S161, the USB external sensor 20-1 waits for communication with the wireless communication terminal 10 until an event occurs (Step S161: No). In a case where the USB external sensor 20-1 is, for example, an illuminance sensor, an example of occurrence of the event is that the illuminance detected by the USB external sensor 20-1 exceeds a predetermined threshold.

When the event occurs (Step S161: Yes), in Step S162, the USB external sensor 20-1 outputs a data transmission request and transmits the data transmission request to the wireless communication terminal 10, and the processor 11 receives the data transmission request.

In Step S163, the processor 11 that has received the data transmission request transmits the data acquisition request to the USB external sensor 20-1, and the USB external sensor 20-1 receives the data acquisition request.

In Step S164, the USB external sensor 20-1 that has received the data acquisition request transmits the USB external sensor data to the wireless communication terminal 10, and the processor 11 receives the USB external sensor data.

Then, in Step S165, the processor 11 transmits the data acquisition request to the BLE external sensor 20-2, and the BLE external sensor 20-2 receives the data acquisition request.

In Step S166, the BLE external sensor 20-2 that has received the data acquisition request transmits the BLE external sensor data to the wireless communication terminal 10, and the processor 11 receives the BLE external sensor data.

Next, in Step S167, the processor 11 generates a payload including the USB external sensor data received in Step S164 and the BLE external sensor data received in Step S166 according to the payload pattern P04 stored in the memory 12 in association with the transmission pattern TP03.

Next, in Step S168, the processor 11 transmits the LPWA data including the payload generated in Step S167 to the wireless communication base station 30. Then, the processor 11 repeats the processing in Steps S163 to S168 at the constant transmission interval T1 until the transmission stop request is received in Step S170.

On the other hand, in Step S169, the USB external sensor 20-1 monitors the end of the event (Step S169: No). Then, when the event ends (Step S169: Yes), in Step 170, the BLE external sensor 20-1 outputs the transmission stop request and transmits the transmission stop request to the wireless communication terminal 10. The processor 11 receives the transmission stop request. In a case where the BLE external sensor 20-1 is, for example, an illuminance sensor, one example of the end of the event is that the illuminance detected by the BLE external sensor 20-1 is equal to or less than the predetermined threshold.

Upon receiving the transmission stop request, the processor 11 ends the transmission of the LPWA data in Step S171.

Figure 10:
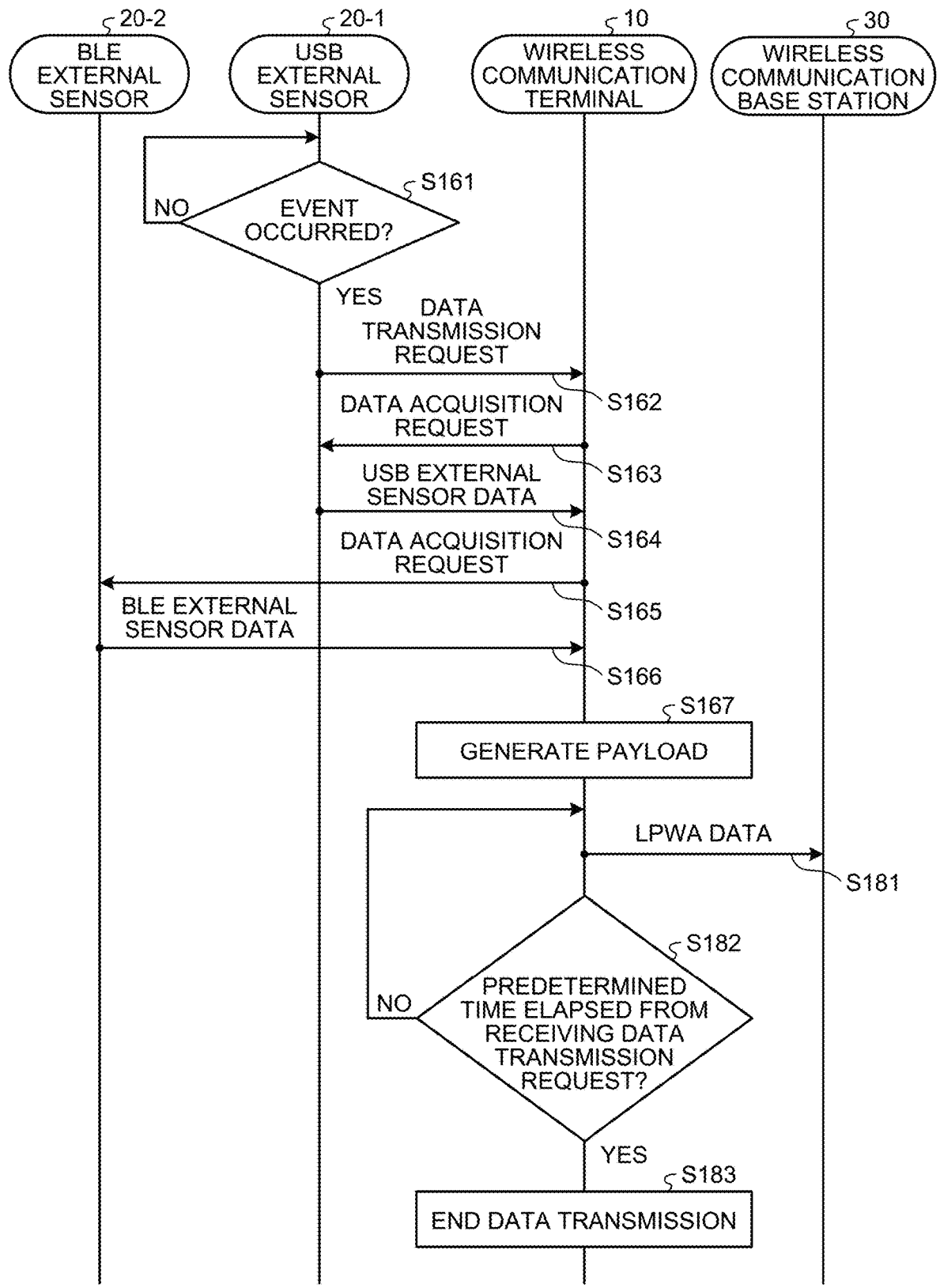
FIG. 10 is a diagram illustrating an example of the processing procedure in the communication system according to the embodiment of the present disclosure.

Processing Example 7: FIG. 10

In Processing Example 7, the transmission pattern TP03 and the payload pattern P04 are stored in the memory 12 in association with each other.

In FIG. 10, since the processing in Steps S161 to S167 is the same as that of Processing Example 6 (FIG. 9), the description thereof is omitted.

In FIG. 10, in Step 181, the processor 11 transmits the LPWA data including the payload generated in Step S167 to the wireless communication base station 30.

Next, in Step S182, the processor 11 determines whether or not a predetermined time TA has elapsed since the data transmission request has been received in Step S162. Then, the processor 11 repeatedly transmits the LPWA data at the constant transmission interval T1 (Step S181) until the predetermined time TA elapses after the data transmission request is received in Step S162 (Step S182: No). The predetermined time TA is preset in the wireless communication terminal 10 by the service provider or the end user of the wireless communication terminal 10, and stored in the memory 12.

Then, when the predetermined time TA has elapsed since the reception of the data transmission request in Step S162 (Step S182: Yes), the processor 11 ends the transmission of the LPWA data in Step S183.

Figure 11:
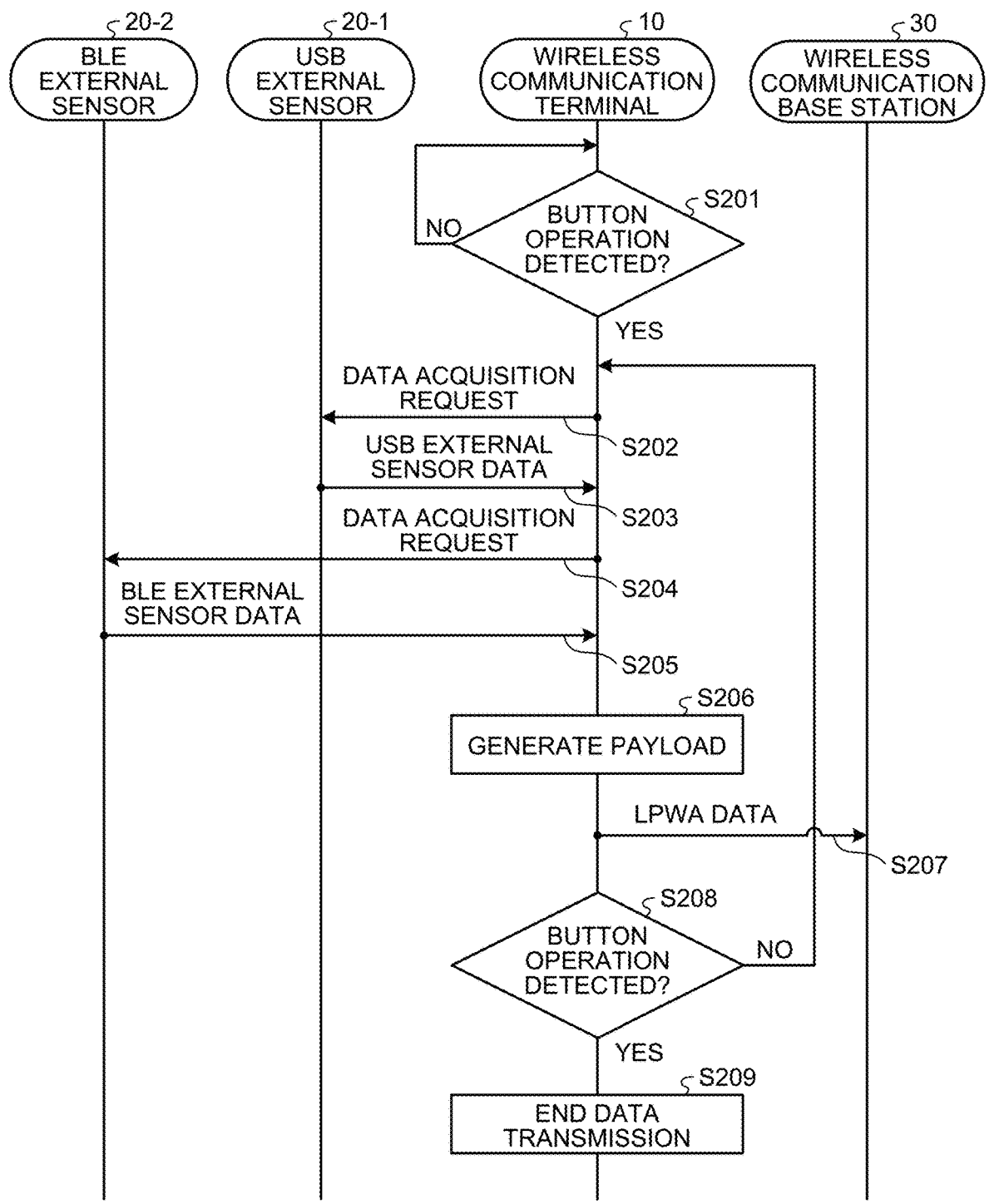
FIG. 11 is a diagram illustrating an example of the processing procedure in the communication system according to the embodiment of the present disclosure.

Processing Example 8: FIG. 11

In Processing Example 8, the transmission pattern TP04 and the payload pattern P04 are stored in the memory 12 in association with each other.

In FIG. 11, in Step S201, the processor 11 waits for communication with the external sensor 20 until a predetermined operation on the operation button 13 is detected (Step S201: No). As an example of the predetermined operation on the operation button 13, there is an operation in which the operation button 13 is continuously pressed for a predetermined time or more (so-called "long pressing operation").

When the predetermined operation on the operation button 13 is detected (Step S201: Yes), the processor 11 transmits the data acquisition request to the USB external sensor 20-1 in Step S202, and the USB external sensor 20-1 receives the data acquisition request.

In Step S203, the USB external sensor 20-1 that has received the data acquisition request transmits the USB external sensor data to the wireless communication terminal 10, and the processor 11 receives the USB external sensor data.

Then, in Step S204, the processor 11 transmits the data acquisition request to the BLE external sensor 20-2, and the BLE external sensor 20-2 receives the data acquisition request.

In Step S205, the BLE external sensor 20-2 that has received the data acquisition request transmits the BLE external sensor data to the wireless communication terminal 10, and the processor 11 receives the BLE external sensor data.

Next, in Step S206, the processor 11 generates a payload including the USB external sensor data received in Step S203 and the BLE external sensor data received in Step S205 according to the payload pattern P04 stored in the memory 12 in association with the transmission pattern TP04.

Next, in Step S207, the processor 11 transmits the LPWA data including the payload generated in Step S206 to the wireless communication base station 30.

After transmitting the LPWA data in Step S207, the processor 11 determines in Step S208 whether the predetermined operation on the operation button 13 has been detected again after detecting the predetermined operation on the operation button 13 in Step S201. Then, until the predetermined operation on the operation button 13 is detected in Step S208 (Step S208: No), the processor 11 repeats the processing in steps S202 to S207 at the constant transmission interval T1.

Then, when the predetermined operation on the operation button 13 is detected again (Step S208: Yes), the processor 11 ends the transmission of the LPWA data in Step S209.

Figure 12:
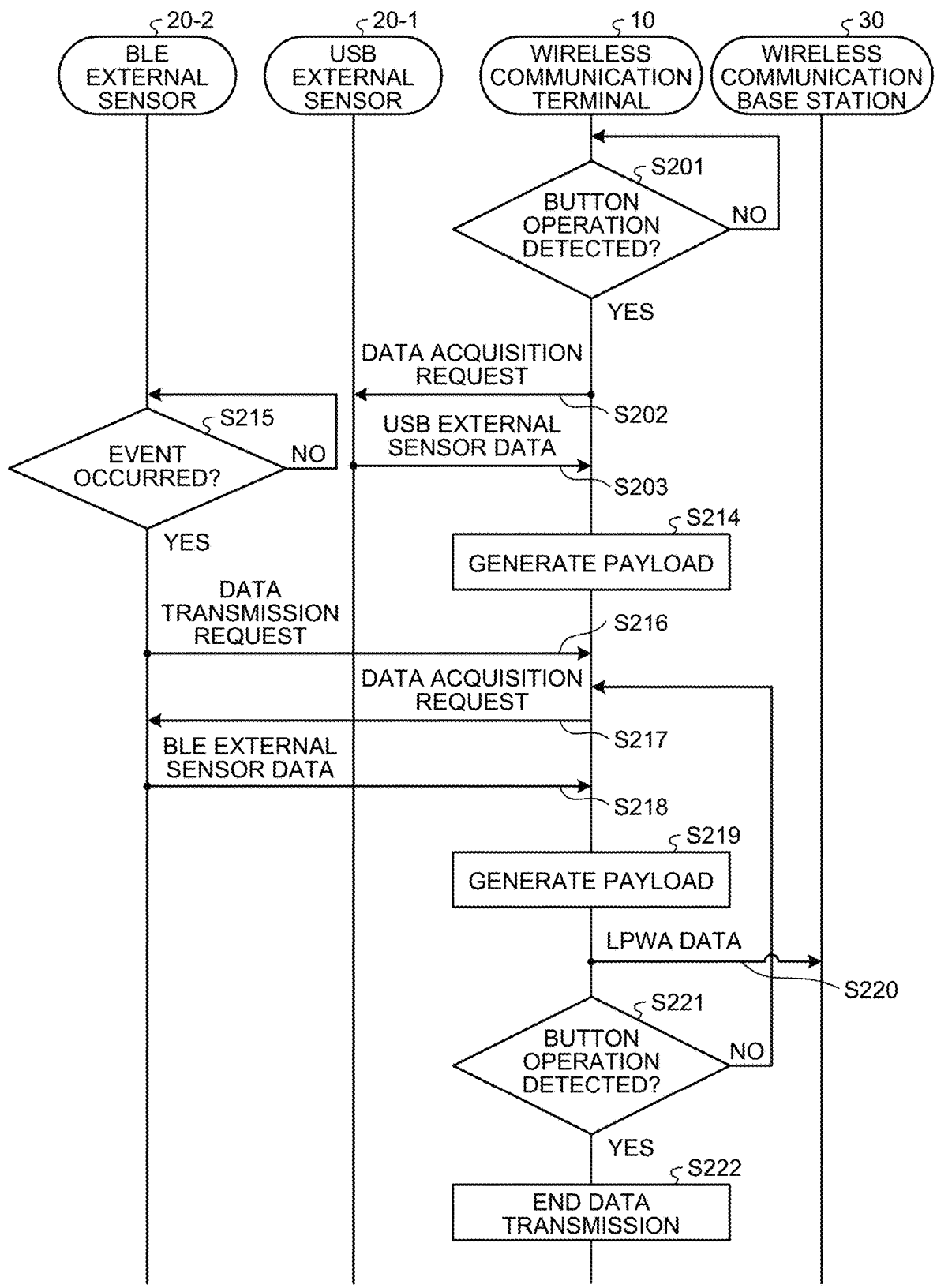
FIG. 12 is a diagram illustrating an example of the processing procedure in the communication system according to the embodiment of the present disclosure.

Processing Example 9: FIG. 12

In Processing Example 9, the transmission pattern TP04 and one of the payload patterns P01 and P03 are stored in the memory 12 in association with each other. Furthermore, in Processing Example 9, the transmission pattern TP03 and one of the payload patterns P02 and P05 are stored in the memory 12 in association with each other.

In FIG. 12, since the processing in Steps S201 to S203 is the same as that of Processing Example 8 (FIG. 11), the description thereof is omitted.

In Step S214, the processor 11 that has received the USB external sensor data in Step S203 generates a payload including the USB external sensor data received in Step S203 according to the payload pattern stored in the memory 12 in association with the transmission pattern TP04.

On the other hand, in Step S215, the BLE external sensor 20-2 waits for communication with the wireless communication terminal 10 until an event occurs (Step S215: No). In a case where the BLE external sensor 20-2 is, for example, a temperature sensor, an example of occurrence of the event is that the temperature detected by the BLE external sensor 20-2 exceeds the predetermined threshold.

When the event occurs (Step S215: Yes), in Step S216, the BLE external sensor 20-2 outputs the data transmission request and transmits the data transmission request to the wireless communication terminal 10, and the processor 11 receives the data transmission request. In other words, after the predetermined operation on the operation button 13 is detected in Step S201, the processor 11 receives the data transmission request from the BLE external sensor 20-2 before transmitting the LPWA data in Step S220. Therefore, the processor 11 temporarily stops the transmission of the LPWA data.

The processor 11 that has received the data transmission request in Step S216 transmits the data acquisition request to the BLE external sensor 20-2 in Step S217, and the BLE external sensor 20-2 receives the data acquisition request.

In Step S218, the BLE external sensor 20-2 that has received the data acquisition request transmits the BLE external sensor data to the wireless communication terminal 10, and the processor 11 receives the BLE external sensor data.

After the predetermined operation on the operation button 13 is detected in Step S201 and before the LPWA data is transmitted in Step S220, the processor 11 receives the data transmission request from the BLE external sensor 20-2 in Step S216. Therefore, in Step S219, the processor 11 discards the payload generated in Step S214, and newly generates a payload including the BLE external sensor data received in Step S218 according to the payload pattern stored in the memory 12 in association with the transmission pattern TP03.

Next, in Step S220, the processor 11 transmits the LPWA data including the payload generated in Step S219 to the wireless communication base station 30.

After transmitting the LPWA data in Step S220, the processor 11 determines in Step S221 whether the predetermined operation on the operation button 13 has been detected again after detecting the predetermined operation on the operation button 13 in Step S201. Then, until the predetermined operation on the operation button 13 is detected in Step S221 (Step S221: No), the processor 11 repeats the processing in Steps S217 to S220 at the constant transmission interval T2.

Then, when the predetermined operation on the operation button 13 is detected again (Step S221: Yes), the processor 11 ends the transmission of the LPWA data in Step S222.

When the data transmission request from the BLE external sensor 20-2 is not received after the predetermined operation on the operation button 13 is detected in Step S201 and before the LPWA data is transmitted in Step S220, the processor 11 transmits the LPWA data including the payload generated in Step S214 to the wireless communication base station 30 in Step S220. Then, until the predetermined operation on the operation button 13 is detected in Step S221 (Step S221: No), the processor 11 repeats the processing in steps S202 to S214 and S220 at the transmission interval T1.

Here, Processing Example 9 can be used, for example, at the time of inspecting a vehicle. In a case where Processing Example 9 is used at the time of inspecting the vehicle, the BLE external sensor 20-2 is connected to the wireless communication terminal 10, but the USB external sensor 20-1 is not connected thereto. Therefore, the processing in Steps S202 and S203 in FIG. 12 is omitted. A worker presses and holds the operation button 13 of the wireless transmission terminal 10 mounted on the vehicle at a start and end of the inspection (Steps S201, S221: Yes). The processor 11 repeatedly transmits the LPWA data including the payload generated in Step S214 at the transmission interval T1 from when the operation button 13 is pressed long in Step S201 until the operation button 13 is pressed long again in Step S221. The payload generated in Step S214 includes information indicating that the vehicle is being inspected. While the transmission of the LPWA data including the payload generated in Step S214 is repeatedly performed at the transmission interval T1, when a temperature detected by the BLE external sensor 20-2 mounted on the vehicle exceeds the predetermined threshold (Step S215: Yes), the processor 11 generates the payload including the BLE external sensor data indicating a detected temperature value in Step S219, and transmits in Step S220 the LPWA data including the payload generated in Step S219.

Note that, in Processing Example 9, while the transmission pattern TP04 and one of the payload patterns P01 and P03 are stored in the memory 12 in association with each other, the transmission pattern TP03 and the payload pattern P04 may be stored in the memory 12 in association with each other. In this case, in Step S219, the processor 11 extracts the USB external sensor data included in the payload generated in Step S214 without discarding the payload generated in Step S214. Then, the processor 11 generates a payload including the USB external sensor data extracted from the payload generated in Step S214 and the BLE external sensor data received in Step S218 according to the payload pattern P04 stored in the memory 12 in association with the transmission pattern TP03.

Processing Examples 1 to 9 have been described above.

Note that the processor 11 may transmit error information to the wireless communication base station 30 when failing to receive the external sensor data from the external sensor 20.

Combinations of the plurality of transmission patterns that can be simultaneously set in the transmission patterns TP01 to T04 are not limited to the above processing examples, and three or more transmission patterns may be simultaneously set in the wireless communication terminal 10, and stored in the memory 12. The service provider or the end user of the wireless communication terminal 10 can arbitrarily set a plurality of transmission patterns TP01 to T04.

[Effects of Disclosed Technology]

As described above, a wireless communication terminal (the wireless communication terminal 10 in the embodiment) according to the present disclosure includes a memory (the memory 12 in the embodiment), a processor (the processor 11 in the embodiment), and a wireless communication module (the LPWA communication module 19 in the embodiment). The memory can store a plurality of mutually different transmission patterns (two or more transmission patterns in the transmission patterns TP01 to TP04 in the embodiment) and payload patterns (any of the payload patterns P01 to P12 in the embodiment) respectively corresponding to the plurality of transmission patterns. The processor generates a payload according to the plurality of transmission patterns and payload patterns stored in the memory. The wireless communication module wirelessly transmits data including the payload.

For example, the plurality of transmission patterns are at least two transmission patterns among a first transmission pattern (the transmission pattern TP01 in the embodiment) in which the trigger for starting transmission of data is the data transmission start time, a second transmission pattern (the transmission pattern TP02 in the embodiment) in which the trigger is the data transmission interval, a third transmission pattern (the transmission pattern TP03 in the embodiment) in which the trigger is the output of the sensor (the external sensor 20 and the motion sensor 16 in the embodiment), and a fourth transmission pattern (the transmission pattern TP04 in the embodiment) in which the trigger is the operation on the operation button (the operation button 13 in the embodiment) included in the wireless communication terminal.

Further, for example, when the first transmission pattern is stored in the memory, the processor acquires data of the external sensor from the external sensor (the external sensor 20 in the embodiment) connected to the wireless communication terminal at a predetermined time before the transmission start time.

Further, for example, when the third transmission pattern is stored in the memory, the processor acquires data of the external sensor from the external sensor in response to the request from the external sensor connected to the wireless communication terminal.

Further, for example, when the fourth transmission pattern is stored in the memory, the processor acquires data of the external sensor from the external sensor connected to the wireless communication terminal in response to the predetermined operation on the operation button.

Furthermore, for example, when the third transmission pattern and the fourth transmission pattern are stored in the memory, the processor generates the first payload according to the predetermined operation on the operation button, and then discards the first payload and then newly generates the second payload including data of the external sensor when there is a request from the external sensor connected to the wireless communication terminal.

According to the above configuration, it is possible to realize a highly versatile wireless communication terminal that can be selectively used according to various purposes. For example, since the service provider or the end user of the wireless communication terminal can arbitrarily set a plurality of transmission patterns different from each other in the wireless communication terminal, the server 50 can collect the external sensor data according to the event, in addition to periodic collection of the external sensor data.

Note that the effects described in the present specification are merely examples and not limited, and other effects may be provided.

Furthermore, the disclosed technology can also adopt the following configurations.

REFERENCE SIGNS LIST

10 WIRELESS COMMUNICATION TERMINAL
20-1 USB EXTERNAL SENSOR
20-2 BLE EXTERNAL SENSOR
11 PROCESSOR
12 MEMORY
13 OPERATION BUTTON
14 LED
15 GPS MODULE
16 MOTION SENSOR
17 USB CONNECTOR
18 BLE COMMUNICATION MODULE
19 LPWA COMMUNICATION MODULE

The invention claimed is:

1. A wireless communication terminal comprising:
a memory capable of storing a plurality of transmission patterns different from each other and a payload pattern corresponding to each of the plurality of transmission patterns;
a processor that generates a payload according to the plurality of transmission patterns and the payload pattern stored in the memory; and
a wireless communication circuit that wirelessly transmits data including the payload,
wherein the plurality of transmission patterns comprises at least two transmission patterns including:
  a first transmission pattern in which a trigger for starting transmission of the data is an output of a sensor, and
  another transmission pattern having a trigger that is different from the trigger of the first transmission pattern,
based on the first transmission pattern being stored in the memory, the processor acquires data of an external sensor from the external sensor in response to a request from the external sensor connected to the wireless communication terminal.

2. The wireless communication terminal according to claim 1, wherein
the another transmission pattern comprises:
  a second transmission pattern in which the trigger is a transmission start time of the data,
  a third transmission pattern in which the trigger is a transmission interval of the data, or a fourth transmission pattern in which the trigger is an operation on an operation button included in the wireless communication terminal.

3. The wireless communication terminal according to claim 2, wherein
based on the second transmission pattern being stored in the memory, the processor acquires data of an external sensor at a predetermined time before the transmission start time from the external sensor connected to the wireless communication terminal.

4. The wireless communication terminal according to claim 3, wherein
the external sensor is at least one of an illuminance sensor, a water level sensor, an odor sensor, a sound sensor, an atmospheric pressure sensor, a humidity sensor, a temperature sensor, and an opening detection sensor.

5. The wireless communication terminal according to claim 2, wherein
based on the fourth transmission pattern being stored in the memory, the processor acquires data of an external sensor from the external sensor connected to the wireless communication terminal in response to a predetermined operation on the operation button.

6. The wireless communication terminal according to claim 2, wherein
based on the first transmission pattern and the fourth transmission pattern being stored in the memory, the processor generates a first payload according to a predetermined operation on the operation button, and then discards the first payload and newly generates a second payload including data of an external sensor when there is a request from the external sensor connected to the wireless communication terminal.

7. The wireless communication terminal according to claim 2, wherein
based on the first transmission pattern and the fourth transmission pattern being stored in the memory, the processor generates a first payload according to a predetermined operation on the operation button, and then generates a second payload including data included in the first payload and data of an external sensor when there is a request from the external sensor connected to the wireless communication terminal.

8. The wireless communication terminal according to claim 2, wherein
the memory is capable of storing the transmission interval of the data in the third transmission pattern.

9. The wireless communication terminal according to claim 1, further comprising:
an acquisition circuit that acquires position information of the wireless communication terminal, wherein
the payload pattern includes the position information and data of an external sensor acquired by the processor from the external sensor connected to the wireless communication terminal.

10. A method performed by a wireless communication terminal having stored in a memory a plurality of transmission patterns different from each other and a payload pattern corresponding to each of the plurality of transmission patterns, the method comprising:
generating a payload according to the plurality of transmission patterns and the payload pattern stored in the memory; and
wirelessly transmitting data including the payload,
wherein the plurality of transmission patterns comprises at least two transmission patterns including:
a first transmission pattern in which a trigger for starting transmission of the data is an output of a sensor, and
another transmission pattern having a trigger that is different from the trigger of the first transmission pattern,
based on the first transmission pattern being stored in the memory, the processor acquires data of an external sensor from the external sensor in response to a request from the external sensor connected to the wireless communication terminal.

11. A non-transitory computer product containing instructions for a method to be performed by a wireless communication terminal having stored in a memory a plurality of transmission patterns different from each other and a payload pattern corresponding to each of the plurality of transmission patterns, the method comprising:
generating a payload according to the plurality of transmission patterns and the payload pattern stored in the memory; and
wirelessly transmitting data including the payload,
wherein the plurality of transmission patterns comprises at least two transmission patterns including:
a first transmission pattern in which a trigger for starting transmission of the data is an output of a sensor, and
another transmission pattern having a trigger that is different from the trigger of the first transmission pattern,
based on the first transmission pattern being stored in the memory, the processor acquires data of an external sensor from the external sensor in response to a request from the external sensor connected to the wireless communication terminal.

* * * * *